United States Patent
O'Rear et al.

(10) Patent No.: US 7,033,552 B2
(45) Date of Patent: Apr. 25, 2006

(54) UPGRADING FISCHER-TROPSCH AND PETROLEUM-DERIVED NAPHTHAS AND DISTILLATES

(75) Inventors: Dennis J. O'Rear, Petaluma, CA (US); Lawrence W. Jossens, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 812 days.

(21) Appl. No.: 10/059,224

(22) Filed: Jan. 31, 2002

(65) Prior Publication Data

US 2003/0143135 A1    Jul. 31, 2003

(51) Int. Cl.
*F28D 21/00* (2006.01)
*B01J 8/00* (2006.01)

(52) U.S. Cl. ............ 422/194; 422/207; 422/218; 48/127.5; 48/127.7; 48/127.9

(58) Field of Classification Search ........ 422/194, 422/207, 218; 48/127.5, 127.7, 127.9
See application file for complete search history.

(56) References Cited

U.S. PATENT DOCUMENTS

| | | | |
|---|---|---|---|
| 3,540,997 A | 11/1970 | Hahn et al. | |
| 4,041,096 A | 8/1977 | Kuo | |
| 4,080,397 A * | 3/1978 | Derr et al. | 208/79 |
| 4,111,792 A | 9/1978 | Caesar et al. | |
| 4,252,096 A | 2/1981 | Kennedy | |
| 4,252,736 A | 2/1981 | Haag et al. | |
| 4,365,820 A | 12/1982 | Rush | |
| 4,456,527 A | 6/1984 | Buss et al. | |
| 4,605,680 A | 8/1986 | Beuther et al. | |
| 4,647,368 A * | 3/1987 | McGuiness et al. | 208/60 |
| 4,673,487 A | 6/1987 | Miller | |
| 4,795,549 A | 1/1989 | Coughlin et al. | |
| 4,851,109 A | 7/1989 | Chen et al. | |
| 4,911,822 A | 3/1990 | Franck et al. | |
| 5,100,533 A * | 3/1992 | Le et al. | 208/67 |
| 5,322,615 A | 6/1994 | Holtermann et al. | |
| 5,562,817 A | 10/1996 | Mon et al. | |
| 5,601,698 A | 2/1997 | Innes | |
| 5,643,441 A * | 7/1997 | Timken et al. | 208/89 |
| 5,770,042 A | 6/1998 | Galperin et al. | |

(Continued)

FOREIGN PATENT DOCUMENTS

EP          0583836          2/1994

(Continued)

OTHER PUBLICATIONS

D.M. Little, Catalytic Reforming, PennWell Books (1985).

(Continued)

*Primary Examiner*—N. Bhat
(74) *Attorney, Agent, or Firm*—Buchanan Ingersoll PC (57) ABSTRACT

A process for upgrading at least one of a Fischer-Tropsch naphtha and a Fischer-Tropsch distillate to produce at least one of a gasoline component, a distillate fuel or a lube base feedstock component. The process includes reforming a Fischer-Tropsch naphtha to produce hydrogen by-product and a gasoline component with a research octane rating of at least about 80. The process further includes upgrading a Fischer-Tropsch distillate using the hydrogen by-product to produce a distillate fuel and/or a lube base feedstock component.

20 Claims, 3 Drawing Sheets

U.S. PATENT DOCUMENTS

| | | | |
|---|---|---|---|
| 5,882,505 A | 3/1999 | Wittenbrink et al. | |
| 5,965,475 A * | 10/1999 | Wittenbrink et al. | 502/66 |
| 6,180,842 B1 | 1/2001 | Berlowitz et al. | |
| 6,309,432 B1 | 10/2001 | Wittenbrink et al. | |
| 6,392,109 B1 * | 5/2002 | O'Rear et al. | 585/323 |
| 6,583,186 B1 | 6/2003 | Moore, Jr. | |
| 6,596,781 B1 * | 7/2003 | Schinski | 518/700 |
| 6,846,848 B1 * | 1/2005 | Wittenbrink et al. | 518/700 |
| 6,863,802 B1 * | 3/2005 | O'Rear et al. | 208/133 |

FOREIGN PATENT DOCUMENTS

| | | |
|---|---|---|
| EP | 0 921 184 A1 | 6/1999 |
| GB | 805111 | 11/1958 |
| GB | 2388611 | 11/2003 |
| WO | 0183406 | 11/2001 |
| WO | 02102749 | 12/2002 |

OTHER PUBLICATIONS

U.S. Appl. No. 10/059,383, O'Rear et al., filed Jan. 31, 2002, Upgrading Fischer-Tropsch and Petroleum-Derived Naphthas and Distillates.

U.S. Appl. No. 10/059,381, O'Rear et al., filed Jan. 31, 2002, Upgrading Fischer-Tropsch and Petroleum-Derived Naphthas and Distillates.

U.S. Appl. No. 10/059,382, O'Rear et al., filed Jan. 31, 2002, Upgrading Fischer-Tropsch and Petroleum-Derived Naphthas and Distillates.

UK Search Report dated Jul. 25, 2003.

UK Search Report dated Feb. 26, 2004.

UK Search Report dated Mar. 1, 2004.

PCT Written Opinion dated Feb. 20, 2004.

* cited by examiner

UPGRADING FISCHER-TROPSCH AND PETROLEUM-DERIVED NAPHTHAS AND DISTILLATES

BACKGROUND OF THE INVENTION

1. Field of Invention

The present invention is directed to the conversion of remote natural gases into saleable transportation fuels and petroleum products. More specifically, this invention is directed to upgrading by, for example, hydrotreating, hydrocracking and hydrodewaxing Fischer-Tropsch and/or petroleum-derived naphthas and distillates for use in saleable transportation fuels and petroleum products.

2. Description of Related Art

The Fischer-Tropsch reaction is a well known reaction, and catalysts and conditions for performing Fischer-Tropsch reactions are well known to those of skill in the art, and are described, for example, in EP 0 921 184A1, the contents of which are hereby incorporated by reference in their entirety. The Fischer-Tropsch process converts synthesis gas into linear hydrocarbons(n-paraffins, linear olefins and minor amounts of fatty acids). Due to the linear nature of such products, once they have been subjected to removal of heteroatoms and isomerization, they are well-suited for use in various transportation fuels and other saleable petroleum products including, but not limited to, jet fuels, diesel fuels and petrochemical feedstocks including, but not limited to, benzene, toluene and xylene.

However, lighter naphtha fractions are generally poorly suited for use in conventional gasolines because their linear nature causes them to exhibit a very low octane rating. Further, although naphtha can be used as a petrochemical feedstock for ethylene production, naphtha has not been found to be suitable for transportation fuels. In addition, even though naphtha may be suitable as a fuel for fuel cell vehicles, because fuel cell vehicles have not yet become widely used, a need still exists for a process to convert naphtha so that it can be used in conventional transportation fuels.

In addition to the need to convert the naphtha fraction of a Fischer-Tropsch process, there is also a need to upgrade (e.g., hydrotreat, hydrocrack or hydrodewax) heavier boiling distillates from the Fischer-Tropsch process so that they are acceptable for use in transportation fuels and other saleable petroleum products.

More specifically, products of the Fischer-Tropsch process, in finished products, exhibit boiling ranges having unacceptable levels of oxygenates and olefins (alcohols and traces of acids). Also, the content of linear hydrocarbons in such products is so high that the resulting products exhibit unacceptable cold climate properties including, but not limited to, jet freeze point, diesel cloud point, and lube base stock pour point. Traditionally, these products can be upgraded to obtain saleable transportation fuels and lube base stocks by employing various processes including, but not limited to, hydrotreating, hydrocracking, hydrodewaxing, combinations thereof and the like.

Although such processes can upgrade Fischer-Tropsch products suffering from the above-mentioned problems to obtain saleable transportation fuels and other petroleum products, the disadvantage of these processes is that they require hydrogen. That is, in order to perform the above processes, hydrogen must be separately supplied during the application of these processes to successfully upgrade Fischer-Tropsch products. Although hydrogen can be obtained from synthesis gases, hydrogen can only be obtained from synthesis gases by employing expensive separation processes. Expensive separation processes are necessary to ensure that the hydrogen remains separate from carbon oxides that can otherwise poison catalysts used in hydrotreating, hydrocracking and hydrodewaxing processes. In addition, hydrogen can be supplied from a separate facility that reforms natural gas into hydrogen using stream reforming processes. Unfortunately, the construction and operation of a separate hydrogen production facility is extremely costly. As a result, there is an urgent need for a relatively low-cost source of hydrogen to be used in upgrading processes including, but not limited to, hydrotreating, hydrocracking and hydrodewaxing operations, so that Fischer-Tropsch products can be more inexpensively upgraded to obtain saleable products.

Another problem encountered during upgrading of Fischer-Tropsch distillates is that the stocks created do not contain sulfur but do contain oxygenates. The least expensive catalysts for hydrotreating, hydrocracking and hydrodewaxing use sulfided Group VI and VIII metals including, but not limited to, nickel, cobalt, molybdenum, tungsten, combinations thereof and the like. Non-sulfided catalysts for hydrotreating, hydrocracking and hydrodewaxing are available but are based on expensive noble metals including, but not limited to, platinum, palladium, combinations thereof and the like. Unfortunately, when sulfided catalysts are in the presence of oxygenates and in the absence of sulfur, the oxygen in the feedstock replaces sulfur on the catalyst, leading to a decline in the catalyst's performance. Decreases in catalytic performance can appear in various forms including, but not limited to, decreased activity, selectivity and/or stability. To prevent such a decline in performance, manufacturers typically add a sulfur compound to ensure that the catalyst remains adequately sulfided. Usually, the sulfur compound that is added is a pure chemical such as, for example, a dimethyldisulfide. Unfortunately, pure chemicals are expensive to purchase and require special handling that can create safety concerns and can generate additional costs. As a result, there is an need for a process that maintains sulfided catalysts in their active sulfided state without having to use chemicals.

Finally, there is also a desire for a process for upgrading (e.g., hydrotreating, hydrocracking or hydrodewaxing) petroleum-derived hydrocarbon products that are produced along with natural gases. Petroleum-derived hydrocarbon products produced along with a natural gas can include condensates, naphthas and distillates. These products have chemical compositions that are analogous to compositions of conventional petroleum products, and include a mixture of a variety of hydrocarbons including, but not limited to, linear paraffins, iso-paraffins, cyclo-paraffins, aromatics, mixtures thereof and the like. They also contain sulfur and nitrogen impurities that must be removed to obtain saleable products.

SUMMARY OF INVENTION

The process of the present invention addresses the above needs. The process of the present invention produces at least one of saleable gasoline components, distillate fuel components and lube base stock components by, for example, hydrotreating, hydrocracking and hydrodewaxing (i.e., upgrading) Fischer-Tropsch and/or petroleum-derived naphthas and distillates.

The fuel components produced by the present invention have octane values sufficient for use in conventional transportation fuels and petrochemical feedstocks. In addition, during naphtha reformation, the present invention produces hydrogen by-product that can be used in hydrotreating, hydrocracking and hydrodewaxing processes to inexpensively upgrade Fischer-Tropsch products. Thus, the present invention inexpensively provides at least a portion of the hydrogen needed for hyrdotreatment processes without having to employ expensive separation processes or separate hydrogen production facilities.

Additionally, the present invention can combine Fischer-Tropsch naphthas and distillates with petroleum-derived naphthas and distillates to obtain blended naphthas and distillates having sulphur levels of at least about 1 ppm. Thus, the present invention ensures that sulfided catalysts, used to hydrotreat naphthas and distillates, maintain adequate sulfur levels without having to add sulfur by introducing costly pure chemicals.

Finally, by combining Fischer-Tropsch naphthas and distillates with petroleum-derived naphthas and distillates, the present invention can upgrade (e.g., hydrotreat, hydrocrack or hydrodewax) petroleum hydrocarbon products, including condensates, naphthas and distillates, to obtain saleable gasoline components and petroleum feedstock products.

A process according to the present invention for upgrading at least one of a Fischer-Tropsch naphtha and a Fischer-Tropsch distillate, to produce at least one of a gasoline component, a distillate fuel component, or a lube base stock component, can include reforming a Fischer-Tropsch naphtha to produce hydrogen by-product and a gasoline component with a research octane rating of at least about 80. The hydrogen by-product is then used to upgrade a Fischer-Tropsch distillate to produce distillate fuel components and/or lube base stock blending components.

A process, according to the present invention, for upgrading a Fischer-Tropsch naphtha can include hydrotreating Fischer-Tropsch naphtha to remove oxygenates producing hydrotreated Fischer-Tropsch naphtha. The process can further include reforming the hydrotreated Fischer-Tropsch naphtha producing hydrogen by-product and a gasoline component having a research octane rating of at least about 80. Finally, the hydrogen by-product is recirculated to hydrotreat said Fischer-Tropsch naphtha.

Another process, according to the present invention, for upgrading a Fischer-Tropsch naphtha to obtain a gasoline component can include mixing Fischer-Tropsch naphtha with petroleum-derived naphtha to obtain a blended naphtha having a sulfur level of at least about 1 ppm. The blended naphtha is hydrotreated to produce hydrotreated blended naphtha. Finally, the hydrotreated blended naphtha is reformed producing hydrogen by-product and a gasoline component having an research octane rating of at least about 80.

A process of the present invention for upgrading a Fischer-Tropsch distillate to produce at least one of a distillate fuel and a lube base stock component can include mixing Fischer-Tropsch distillate and petroleum-derived distillate to obtain a blended distillate having a sulfur level of at least about 1 ppm. The blended distillate is hydrotreated producing hydrotreated blended distillate. Finally, the hydrotreated blended distillate is upgraded producing distillate fuel components and/or lube base stock blending components.

Finally, a plant of the present invention for upgrading at least one of a Fischer-Tropsch naphtha and a Fischer-Tropsch distillate to obtain at least one of a gasoline componenet, a distillate fuel or a lube base feedstock component can include a hydrocarbon source providing a hydrocarbon. A separator separates hydrocarbon gas, hydrocarbon condensate and crude oil from the hydrocarbon. A synthesis gas from the hydrocarbon gas. A Fischer-Tropsch reactor positioned downstream from the synthesis gas generator conducts a Fischer-Tropsch process on the synthesis gas to obtain Fischer-Tropsch naphtha and Fischer-Tropsch distillate. A naphtha hydrotreatment reactor downstream from the Fischer-Tropsch reactor hydrotreats the Fischer-Tropsch naphtha. A naphtha reformer downstream from the hydrotreatment reactor reforms hydrotreated naphtha to obtain hydrogen by-product and a gasoline component including at least about 10% aromatics. A distillate hydrotreatment reactor downstream from the Fischer-Tropsch reactor hydrotreats the Fischer-Tropsch distillate. Finally, a distillate upgrader is downstream from the distillate hydrotreatment reactor and relative to the naphtha reformer so that hydrogen by-product from the reformer recirculates to the upgrader so that the upgrader can upgrade hydrotreated distillate to produce distillate fuel and/or a lube base feedstock component.

DETAILED DESCRIPTION OF THE PREFERRED EMBODIMENTS

Using the present invention, Fischer-Tropsch naphtha, and optionally petroleum-derived naphtha, can be reformed to make aromatics and hydrogen by-product. The resulting aromatics can increase the octane number of the naphtha to permit the naphtha to be used as a conventional gasoline or a blend stock in conventional gasoline. The resulting aromatics can also be sold as valuable petrochemicals including, but not limited to, benzene, toluene and xylene.

There are two classes of reforming processes: catalytic reforming and AROMAX® reforming. The process of the present invention can employ either or both catalytic reforming or AROMAX® reforming technologies to convert the Fischer-Tropsch naphthas into aromatics. Catalytic reforming, as described, for example, in Catalytic Reforming, by D. M. Little, PennWell Books (1985), is a well-known process. Similarly, AROMAX® reforming is also a well-known process, and is described, for example, in Petroleum & Petrochemical International, Volume 12, No. 12, pages 65 to 68, as well as U.S. Pat. No. 4,456,527 to Buss et al. The feed to either of these reforming processes should have very low levels of heteroatoms (e.g., sulfur, nitrogen, and oxygen). Fischer-Tropsch naphthas generally have very low levels of sulfur and nitrogen, but often have appreciable levels of oxygen in the form of alcohols and traces of acids and other oxygenates. These heteroatoms can be removed by use of a hydrotreater. The preferred hydrotreating catalysts use inexpensive non-noble metals from Groups VI and VIII including, but not limited to, nickel, cobalt, molybdenum, tungsten, combinations thereof and the like. These non-noble metals are active when they are in the sulfided state. To prevent transfer of the sulfur from the sulfided hydrotreating catalysts to the reforming catalysts (which could poison the reforming catalyst), the product is stripped to remove hydrogen sulfide and other light sulfur compounds, and is optionally treated with a sulfur adsorbent. Examples of the use of adsorbents (guard beds) to protect reforming catalysts are described in U.S. Pat. Nos. 5,601,698, and 5,322,615

The hydrogen by-product from the reformer is used to upgrade the distillates by the use of hydrogen consuming processes that include, for example, hydrotreating, hydrocracking, and hydrodewaxing. By using the hydrogen by-product from the naphtha reformation, the present invention avoids the need for expensive separation processes or separate hydrogen production facilities to supply added hydrogen needed for distillate upgrading.

Although processes of the present invention can produce hydrogen by-product for use in hydrogen-consumer upgrading processes, at least initially, it may be necessary in processes of the invention to provide hydrogen. In particular, because hydrogen produced in the reformer can be used in other operations, including the hydrotreatment of naphtha and/or distillate, provisions may need to be made to provide hydrogen at startup. There are several solutions to this problem including, but not limited to, providing a separate source of hydrogen, such as from high pressure containers, making the hydrogen from electrolysis units, or providing a source of low-sulfur hydrotreated naphtha for the reformer for startup. In addition, in processes of the invention wherein hydrogen by-product is not being produced, it is understood that hydrogen is being provided to conduct, for example, hydrotreatment and/or upgrading processes. Moreover, it is also understood that in instances where the amount of hydrogen by-product produced during a process of the present invention is not sufficient to conduct hydrotreatment and/or upgrading processes, additional hydrogen may be added to the process to supplement the hydrogen by-product being consumed by such processes.

In a preferred embodiment, the Fischer-Tropsch naphtha is mixed with a petroleum-derived naphtha to obtain a blended naphtha having a sulfur level above about 1 ppm, preferably above about 10 ppm. This blended naphtha is then hydrotreated over an inexpensive sulfided hydrotreating catalyst to remove oxygenates from the Fischer-Tropsch naphtha and sulfur from the petroleum-derived naphtha. Again, without the presence of some type of sulfur compound in the feedstock, the sulfur in the sulfided hydrotreating catalyst would eventually be removed and the hydrotreating catalyst would suffer a loss in performance.

Likewise, in another preferred embodiment, the Fischer-Tropsch distillate is mixed with a petroleum-derived distillate to increase the sulfur level of the blended distillate to above about 1 ppm, preferably above about 10 ppm. This blended distillate is then hydrotreated over an inexpensive sulfided hydrotreating catalyst to remove oxygenates from the Fischer-Tropsch distillate and sulfur from the petroleum-derived distillate. Without the presence of some type of sulfur compound in the feedstock, the sulfur in the sulfided hydrotreating catalyst would eventually be removed and the hydrotreating catalyst would suffer a loss in performance.

Although the need to maintain sulfided catalysts in a sulfided state while processing oxygen-containing Fischer-Tropsch feedstocks is known in the art, the use of petroleum-derived feedstocks as a source of sulfur is not known. For instance, U.S. Pat. No. 4,080,397 to Mobil describes hydrotreating of 350° F.+Fischer-Tropsch distillates in the presence of added sulfur to prevent oxidation of a sulfided hydrotreating catalyst by oxygenates in the Fischer-Tropsch feed. However, the '397 patent does not describe the source the hydrogen used during hydrotreatment, nor does it describe using petroleum-derived feedstocks as the source of the sulfur compound.

It is also within the scope of this invention that the hydrotreatment of blended streams be done in the same reactor. Thus, a Fischer-Tropsch naphtha and a Fischer-Tropsch distillate can be hydrotreated in one reactor together with a petroleum-derived naphtha, condensate, distillate or combinations thereof, provided that the sulfur content of the blend is greater than about 1 ppm, preferably greater than about 10 ppm.

In addition, while it may be preferable to perform both naphtha reformation and distillate upgrading in a single process, processes, according to the present invention, need not include both naphtha reformation and distillate upgrading processes. That is, it is within the scope of the present invention to have a process wherein naphtha reformation or distillate upgrading are performed separately. In such embodiments it may be necessary to provide hydrogen during start up and/or hydrogen to be used in upgrading processes including, but not limited to, hydrotreating, hydrocracking and hydrodewaxing processes.

In a preferred embodiment wherein naphtha reformation is conducted separately, hydrogen may be supplied initially to be used to hydrotreat the naphtha before reformation. In addition, at least a portion of the hydrogen by-product generated during reformation can be recirculated to hydrotreat naphtha before reformation. The recirculation of hydrogen by-product generated during reformation may substantially limit the amount of hydrogen that needs to be added for hydrotreatment.

Similarly, in a preferred embodiment wherein a distillate is upgraded separately, hydrogen may need to be supplied during both hydrotreatment and upgrading.

Figure 1:
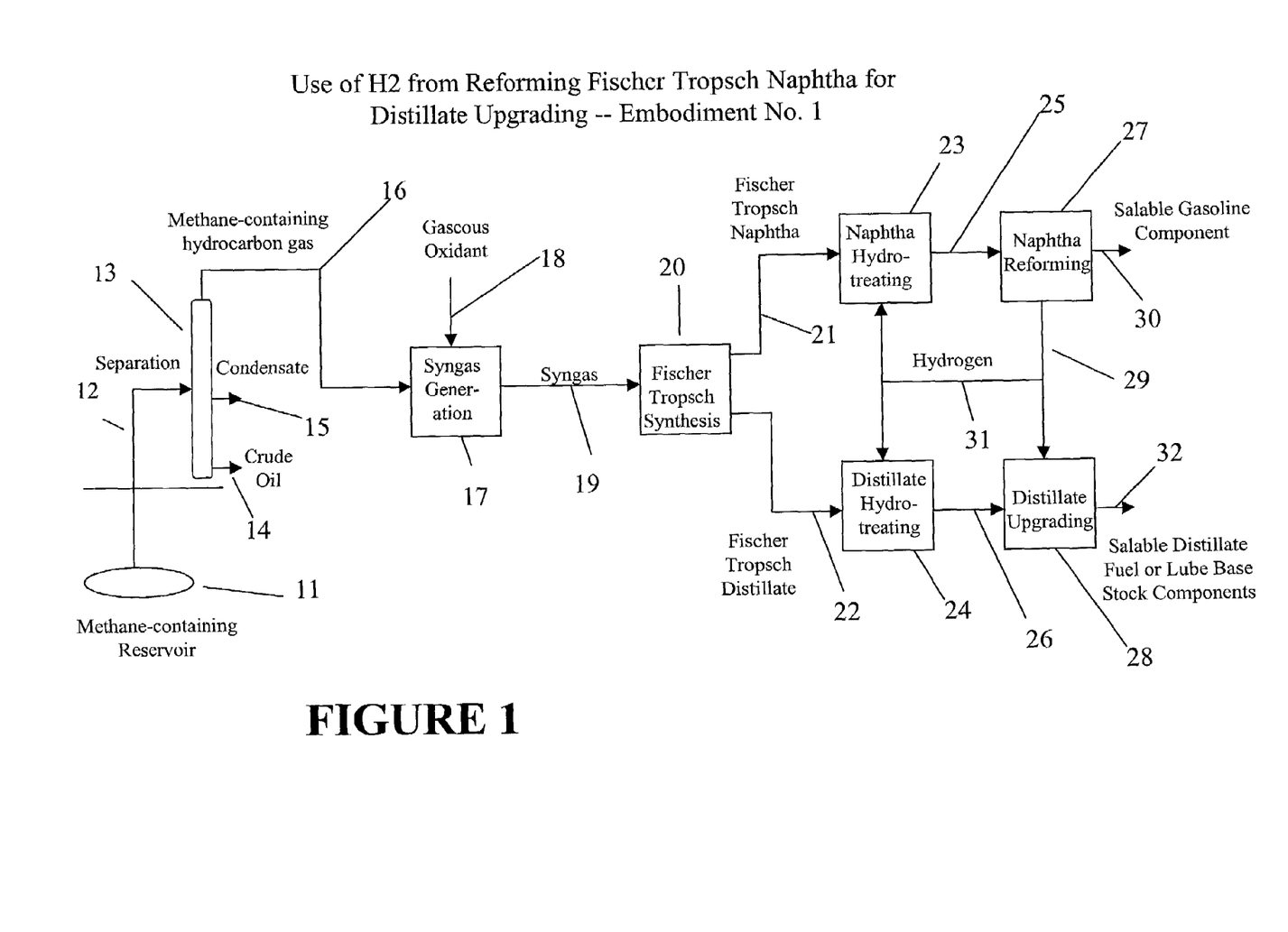
FIG. 1 is a schematic view of a preferred embodiment of the present invention.

A preferred embodiment of the present invention, wherein hydrogen generated during Fischer-Tropsch naphtha reformation is used for distillate upgrading, is depicted in FIG. 1. In this embodiment, a methane-containing hydrocarbon gas feed stream 12 is obtained from a methane-containing terrestrial reservoir 11. The hydrocarbon gas feed stream 12 enters a separator 13. The separator 13 separates the hydrocarbon gas feed stream 12 into a heavier condensate stream 15, a crude oil fraction stream 14 and a methane-containing hydrocarbon gas exit stream 16. The hydrocarbon gas exit stream 16 enters a synthesis gas generator 17. A gaseous oxidant stream 18 also enters the synthesis gas generator 17. At least a part of the methane-containing hydrocarbon exit gas 16 is converted by the synthesis gas generator 17 into a synthesis gas stream 19 (a gas mixture containing at least carbon monoxide and hydrogen) by use of the gaseous oxidant stream 18 (air, $O_2$, enriched air, carbon dioxide and combinations thereof). The synthesis gas stream 19 enters a Fischer-Tropsch reactor 20. The Fischer-Tropsch reactor 20 converts the synthesis gas stream 19 into at least a Fischer-Tropsch naphtha stream 21 and a Fischer-Tropsch distillate stream 22. The Fischer-Tropsch naphtha stream 21 enters a naphtha hydrotreatment reactor 23. The Fischer-Tropsch distillate stream 22 enters a distillate hydrotreatment reactor 24. The naphtha hydrotreatment reactor 23 treats the naphtha stream 21 to remove oxygenates to obtain a hydrotreated naphtha stream 25. The distillate hydrotreatment reactor 24 treats the distillate stream 22 to remove oxygenates to obtain a hydrotreated distillate stream 26. The hydrotreated naphtha stream 25 enters a naphtha reformer 27. The hydrotreated distillate stream 26 enters a distillate upgrader 28 wherein the hydrotreated distillate is upgraded by, for example, hydrocracking and/or hydrodewaxing processes. During naphtha reformation a hydrogen by-product stream 29 is generated. The hydrogen by-product stream 29 enters the naphtha hydrotreatment reactor 23, the distillate hydrotreatment reactor 24 and the distillate upgrader 28 providing additional hydrogen for the hydrotreatment processes conducted therein. Following naphtha reformation, a saleable gasoline component stream 30, containing at least about 10% aromatics, and having a research octane rating of at least about 80, preferably at least about 90, exits the naphtha reformer 27. In addition, a saleable distillate fuel or lube base stock components stream 32 exits the distillate upgrader 28. The catalysts used for hydrotreating the naphtha and distillate, and used to upgrade the hydrotreated distillate either comprise a noble metal including, but not limited to, Pd, Pt, combinations thereof or the like, or a non-noble metal including, but not limited to, Ni, Co, W, Mo, combinations thereof or the like. If used, the non-noble metal catalysts are in a sulfided form, and preferably sulfur is added to the unit either continuously or periodically. The sulfur can be added, for example, in the form of a chemical, such as dimethyldisulfide. If the hydrotreating catalyst is a noble metal (less preferred), it is preferably not sulfided.

Figure 2:
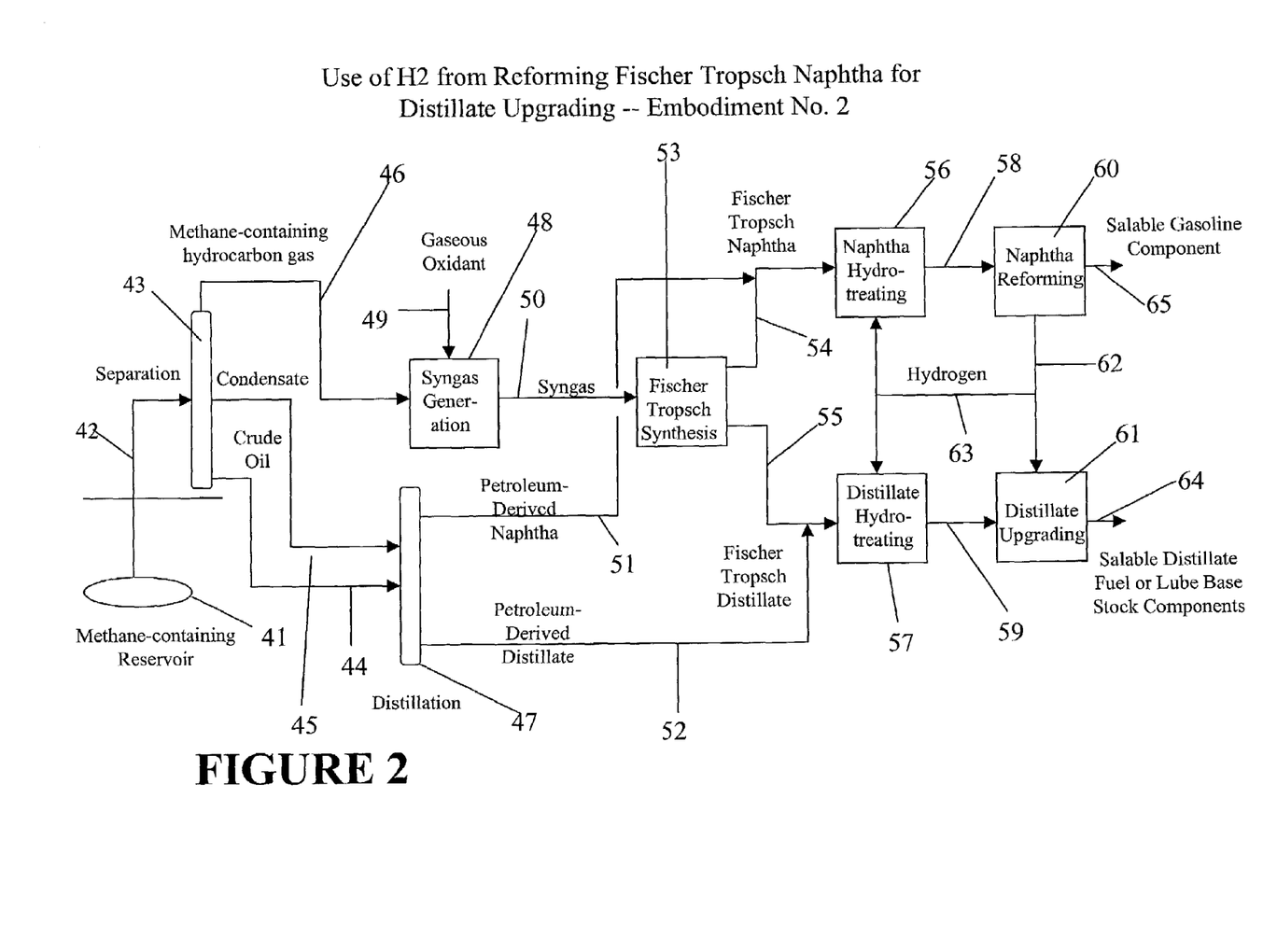
FIG. 2 is a schematic view of another preferred embodiment of the present invention.

Another preferred embodiment of the present invention, wherein hydrogen generated during Fischer-Tropsch naphtha reformation is used for distillate upgrading, is depicted in FIG. 2. In this embodiment, a methane-containing hydrocarbon feed gas 42 is obtained from a methane-containing terrestrial reservoir 41. A heavier condensate stream 45 and/or a crude oil fraction stream 44 are separated from the methane-containing hydrocarbon feed gas 42 in a separator 43. A methane-containing hydrocarbon gas exit stream 46 exits the separator 43 and enters a synthesis gas generator 48. A gaseous oxidant stream 49 also enters the synthesis gas generator 48. A synthesis gas stream 50 exits the generator 48 and enters a Fischer-Tropsch reactor 53. The Fischer-Tropsch reactor 53 generates at least a Fischer-Tropsch naphtha stream 54 and a Fischer-Tropsch distillate-containing stream 55. The crude oil stream 44 and the condensate stream 45 enter a distillate reactor 47. At least a petroleum-derived naphtha stream 51 and a petroleum-derived distillate stream 52 exit the distillate reactor 47. The petroleum-derived naphtha stream 51 mixes with the Fischer-Tropsch distillate stream 54 to produce a blended naphtha having more than about 1 ppm sulfur, preferably more than about 10 ppm sulfur. The blended naphtha then enters a naphtha hydrotreating reactor 56. The petroleum-derived distillate stream 52 mixes with the Fischer-Tropsch distillate stream 55 to produce a blended distillate comprising more than about 1 ppm sulfur, preferably more than about 10 ppm sulfur. The blended distillate enters a distillate hydrotreatment reactor 57. The blended naphtha is hydrotreated to remove oxygenates. A hydrotreated naphtha stream 58 exits the naphtha hydrotreatment reactor 56. The hydrotreated naphtha stream 58 then enters a naphtha reformer 60. The blended distillate is hydrotreated in the distillate hydrotreating reactor 57 to remove oxygenates, and a hydrotreated distillate stream 59 exits the distillate hydrotreatment reactor 57. The hydrotreated distillate stream 59 enters a distillate upgrader 61. During reformation of the blended naphtha in the naphtha reformer 60, a hydrogen by-product stream 62 is generated. A portion of the hydrogen by-product stream 62 is recirculated in a hydrogen recirculation stream 63 to provide additional hydrogen needed for the hydrotreatment processes being conducted within the naphtha and distillate hydrotreatment reactors 56, 57. In addition, hydrogen from hydrogen by-product stream 62 enters the distillate upgrader 61 to provide additional hydrogen for upgrading processes (e.g., hydrocracking and hydrodewaxing processes) conducted therein for upgrading the blended distillate. A saleable gasoline component stream 65, comprising at least about 10% aromatics, and having a research octane rating of at least about 80, preferably at least about 90, exits the naphtha reformer 60 following naphtha reformation. Finally, a salable distillate fuel or lube base stock component stream 64 exits the distillate upgrader 61.

Figure 3:
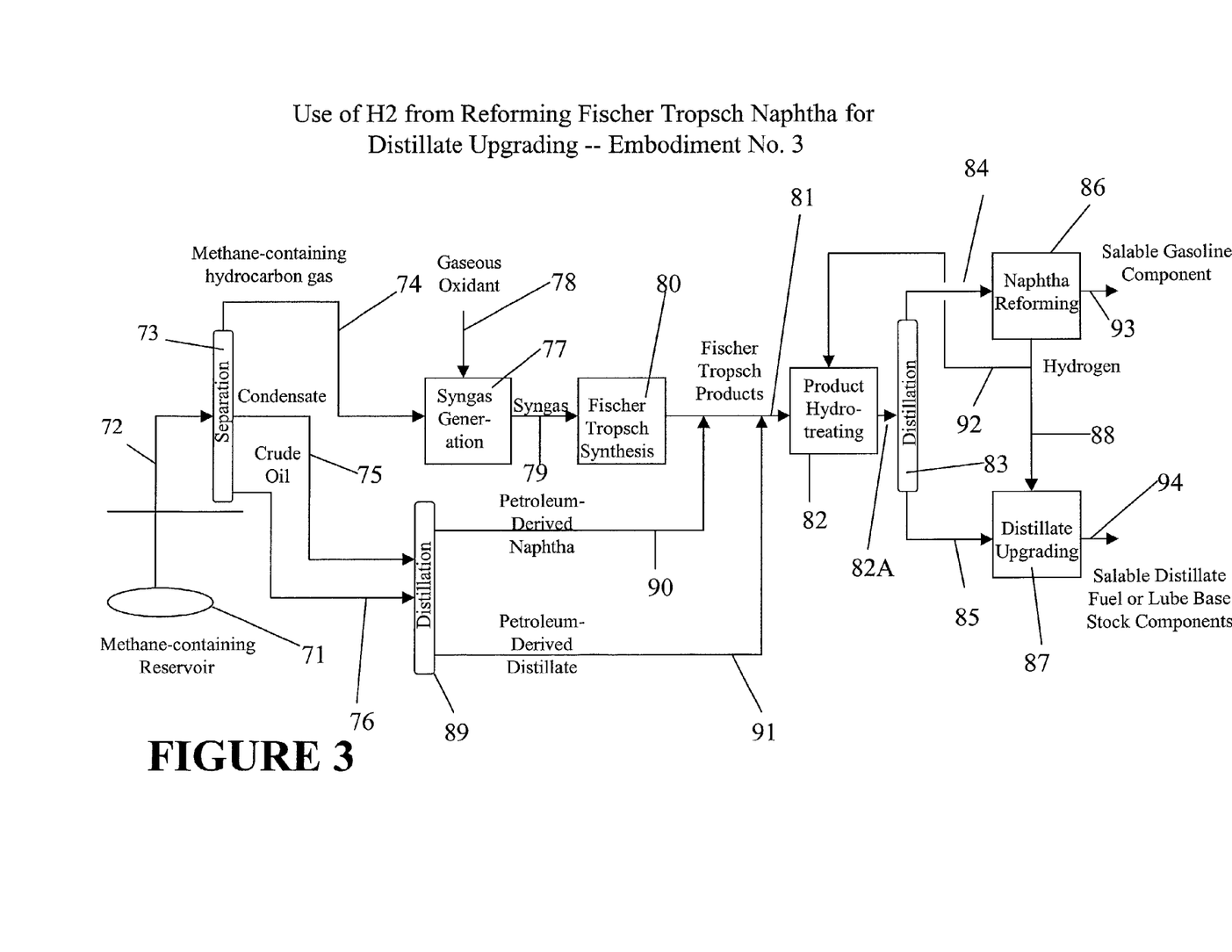
FIG. 3 is a schematic view of another preferred embodiment of the present invention.

Another preferred embodiment of the present invention, wherein hydrogen generated during Fischer-Tropsch naphtha reformation is used for distillate upgrading, is depicted in FIG. 3. In this embodiment, a methane-containing hydrocarbon feed gas 72 is obtained from a methane-containing terrestrial reservoir 71. A heavier condensate stream 75 and/or crude oil fraction stream 76 are separated from the methane-containing hydrocarbon feed gas 72 in a separator 73. A methane-containing hydrocarbon exit stream gas 74 exits the separator 73 and enters a synthesis gas generator 77. A gaseous oxidant stream 78 also enters the synthesis gas generator 77. A synthesis gas stream 79 exits the synthesis gas generator 77 and enters a Fischer-Tropsch reactor 80. A Fischer-Tropsch product stream 81 exits the Fischer-Tropsch reactor 80. The crude oil stream 76 and the condensate stream 75 exit the separator 73 and enter a distillate reactor 89. At least a petroleum-derived naphtha stream 90 and a petroleum-derived distillate stream 91 exit the distillate reactor 89 and mix with the Fischer-Tropsch product stream 81 to obtain a blended product stream, comprising at least about 1 ppm sulfur, preferably at least about 10 ppm sulfur. The blended product stream enters a hydrotreatment reactor 82, wherein oxygenates are removed from the Fischer-Tropsch distillate and naphtha and sulfur is removed from the petroleum-derived distillate and naphtha. A hydrotreated product stream 82A exits the hyrotreatment reactor 82 and enters a distillate reactor 83. At least a blended naphtha stream 84 and a blended distillate stream 85 exit the distillate reactor 83. The blended naphtha stream 84 enters a naphtha reformer 86 wherein the naphtha is reformed generating a hydrogen by-product stream 88 and a salable gasoline product stream 93. The gasoline product stream 93 comprises at least about 10% aromatics and has a research octane rating of at least about 80, preferably at least about 90. The blended distillate stream 85 exits the distillate reactor 83 and enters a distillate upgrader 87. The hydrogen by-product stream 88 exiting the naphtha reformer enters the distillate upgrader 87 providing additional hydrogen needed for upgrading processes (e.g., hydrocracking and hydrodewaxing processes) conducted therein to upgrade the distillate. In addition, a portion of the hydrogen by-product stream 88 is recirculated in a hydrogen recirculation stream 92 to the hydrotreatment reactor 82 to provide additional hydrogen needed for the hydrotreatment processes conducted therein for the removal of oxygenates and sulfur. Finally, a saleable distillate fuel or lube base stock components stream 94 exits the distillate upgrader 87.

EXAMPLES

The invention will be further illustrated by the following example, which sets forth a particularly advantageous method embodiment. While the Example is provided to illustrate the present invention, it is not intended to limit it.

Example 1

A Fischer-Tropsch naphtha and distillate product are blended to provide a mixture that contains approximately 1 weight % oxygen and less than about 10 ppm sulfur. This mixture is hydrocracked over a sulfided nickel tungsten catalyst at 663° F., 1.0 LHSV, 77% conversion, 1100 psig, and 10000 SCFB hydrogen recirculation gas rate. After 1500 hours of operation, the product at that time is fractionated and the 300–650° F. diesel portion is isolated. The sulfur content of the diesel fraction, as determined by the Antek method, is about 3.2 ppm by weight. This same sample is run in duplicate on a Dohrmann analyzer and the resulting sulfur levels are about 2.4 and about 2.6 nanograms per micro liter or about 3 ppm by weight sulfur. Both the Dohrmann and the Antek analyzers use oxidative approaches for the determination of sulfur and are reliable methods. The presence of sulfur in this product is confirmed in subsequent experiments and is believed to be due to displacement of the sulfur from the catalyst with oxygenates in the feedstock. This problem can be avoided by adding a sulfur-containing compound to the Fischer-Tropsch feedstock so that the blend has more than about 1 ppm sulfur, preferably more than about 10 ppm sulfur.

While the present invention has been described with reference to specific embodiments, this application is intended to cover those various changes and substitutions that may be made by those of ordinary skill in the art without departing from the spirit and scope of the appended claims.

What is claimed is:

1. A plant for upgrading at least one of a Fischer-Tropsch naphtha and a Fischer-Tropsch distillate to produce at least one of a gasoline component, a distillate fuel or a lube base feedstock component, said plant comprising:
   a) a hydrocarbon source providing a hydrocarbon;
   b) a separator that separates hydrocarbon gas, hydrocarbon condensate and crude oil from the hydrocarbon;
   c) a synthesis gas generator that generates a synthesis gas from the hydrocarbon gas, said synthesis gas generator positioned downstream from said separator;
   d) a Fischer-Tropsch reactor positioned downstream from said synthesis gas generator that conducts a Fischer-Tropsch process on the synthesis gas to obtain a Fischer-Tropsch naphtha and a Fischer-Tropsch distillate;
   e) a naphtha hydrotreatment reactor positioned downstream from said Fischer-Tropsch reactor that hydrotreats the Fischer-Tropsch naphtha produced from said Fischer-Tropsch reactor;
   f) a naphtha reformer positioned downstream from said naphtha hydrotreatment reactor that reforms hydrotreated naphtha produced from said naphtha hydrotreatment reactor to obtain hydrogen by-product and a gasoline component comprising at least about 10% aromatics;
   g) a distillate hydrotreatment reactor positioned downstream from said Fischer-Tropsch reactor that hydrotreats the Fischer-Tropsch distillate produced from said Fischer-Tropsch reactor; and
   h) a distillate upgrader positioned downstream from said distillate hydrotreatment reactor and relative to said naphtha reformer so that the hydrogen by-product from said reformer recirculates to said upgrader so that said upgrader can upgrade hydrotreated distillate produced from said distillate hydrotreatment reactor to produce a distillate fuel and/or a lube base feedstock component.

2. The plant of claim 1, further comprising a distillation reactor positioned downstream from said separator for distilling the hydrocarbon condensate and the crude oil to obtain petroleum-derived naphtha and petroleum-derived distillate.

3. The plant of claim 2, wherein said distillation reactor is positioned relative to said Fischer-Tropsch reactor and said naphtha hydrotreatment reactor so that the Fischer-Tropsch naphtha and the petroleum-derived naphtha mix prior to entering said naphtha hydrotreatment reactor to form a blended naphtha having a sulfur level of at least about 1 ppm.

4. The plant of claim 2, wherein said distillation reactor is positioned relative to said Fischer-Tropsch reactor and said distillate hydrotreatment reactor so that the Fischer-Tropsch distillate and the petroleum-derived distillate mix prior to entering said distillate hydrotreatment reactor to form a blended distillate having a sulfur level of at least about 1 ppm.

5. The plant of claim 1, wherein said naphtha hydrotreatment reactor and said distillate hydrotreatment reactor contain at least one catalyst for hydrotreating said naphtha or said distillate.

6. The plant of claim 5, wherein said catalyst comprises at least one of a noble metal and a non-noble metal.

7. The plant of claim 6, wherein said noble metal is sulfided.

8. The plant of claim 7, wherein said noble metal is sulfided with dimethyldisulfide.

9. The plant of claim 6, wherein said noble metal is selected from the group consisting essentially of Pd, Pt and combinations thereof.

10. The plant of claim 6, wherein said non-noble metal is not sulfided.

11. The plant of claim 6, wherein said non-noble metal is selected from the group consisting essentially of Ni, Co, W, Mo and combinations thereof.

12. The plant of claim 1, further comprising a source of sulfur positioned so that sulfur can be initially supplied to ensure that any catalysts present in said naphtha hydrotreatment reactor and/or said distillate hydrotreatment reactor are adequately sulfided during hydrotreatment.

13. The plant of claim 1, wherein said naphtha hydrotreatment reactor and said distillate hydrotreatment reactor constitute a single hydrotreatment reactor.

14. The plant of claim 1, wherein at least a portion of the hydrogen by-product recirculates to said naphtha hydrotreatment reactor and/or said distillate hydrotreatment reactor to be used to hydrotreat the Fischer-Tropsch naphtha and/or the Fischer-Tropsch distillate.

15. A plant for upgrading at least one of a Fischer-Tropsch naphtha and a Fischer-Tropsch distillate to produce at least one of a gasoline component, a distillate fuel or a lube base feedstock component, said plant comprising:
   a) a hydrocarbon source providing a hydrocarbon;
   b) a separator that separates hydrocarbon gas, hydrocarbon condensate and crude oil from the hydrocarbon;
   c) a synthesis gas generator that generates a synthesis gas from the hydrocarbon gas, said synthesis gas generator positioned downstream from said separator;
   d) a Fischer-Tropsch reactor positioned downstream from said synthesis gas generator that conducts a Fischer-Tropsch process on the synthesis gas to obtain a Fischer-Tropsch naphtha and a Fischer-Tropsch distillate;
   e) a naphtha hydrotreatment reactor positioned downstream from said Fischer-Tropsch reactor that hydrotreats the Fischer-Tropsch naphtha produced from said Fischer-Tropsch reactor;
   f) a naphtha reformer positioned downstream from said naphtha hydrotreatment reactor that reforms hydrotreated naphtha produced from said naphtha hydrotreatment reactor to obtain hydrogen by-product and a gasoline component comprising at least about 10% aromatics;
   g) a distillate hydrotreatment reactor positioned downstream from said Fischer-Tropsch reactor that hydrotreats the Fischer-Tropsch distillate produced from said Fischer-Tropsch reactor;

h) a distillate upgrader positioned downstream from said distillate hydrotreatment reactor and relative to said naphtha reformer so that the hydrogen by-product from said reformer recirculates to said upgrader so that said upgrader can upgrade hydrotreated distillate produced from said distillate hydrotreatment reactor to produce a distillate fuel and/or a lube base feedstock component;

i) a distillation reactor positioned downstream from said separator for distilling the hydrocarbon condensate and the crude oil to obtain a petroleum-derived naphtha and a petroleum-derived distillate; and j) said distillation reactor being positioned relative to said Fischer-Tropsch reactor, said naphtha hydrotreatment reactor and said distillate hydrotreatment reactor so that the Fischer-Tropsch naphtha mixes with the petroleum-derived naphtha prior to entering said naphtha hydrotreatment reactor forming a blended naphtha having a sulfur level of at least about 1 ppm and so that the Fischer-Tropsch distillate mixes with the petroleum-derived distillate prior to entering said distillate hydrotreatment reactor forming a blended distillate having a sulfur level of at least about 1 ppm.

16. The plant of claim 15, wherein said naphtha hydrotreatment reactor and said distillate hydrotreatment reactor contain at least one catalyst for hydrotreating the blended naphtha or the blended distillate, respectively.

17. The plant of claim 15, wherein said naphtha hydrotreatment reactor and said distillate hydrotreatment reactor constitute a single hydrotreatment reactor.

18. A plant for upgrading at least one of a Fischer-Tropsch naphtha and a Fischer-Tropsch distillate to produce at least one of a gasoline component, a distillate fuel or a lube base feedstock component, said plant comprising:

a) a hydrocarbon source providing a hydrocarbon;

b) a separator that separates hydrocarbon gas, hydrocarbon condensate and crude oil from the hydrocarbon;

c) a synthesis gas generator that generates a synthesis gas from said hydrocarbon gas, said synthesis gas generator positioned downstream from said separator;

d) a Fischer-Tropsch reactor positioned downstream from said synthesis gas generator that conducts a Fischer-Tropsch process on the synthesis gas to obtain a Fischer-Tropsch naphtha and a Fischer-Tropsch distillate;

e) a naphtha hydrotreatment reactor positioned downstream from said Fischer-Tropsch reactor that hydrotreats the Fischer-Tropsch naphtha produced from said Fischer-Tropsch reactor;

f) a naphtha reformer positioned downstream from said naphtha hydrotreatment reactor that reforms hydrotreated naphtha produced from said naphtha hydrotreatment reactor to obtain hydrogen by-product and a gasoline component comprising at least about 10% aromatics;

g) a distillate hydrotreatment reactor positioned downstream from said Fischer-Tropsch reactor that hydrotreats the Fischer-Tropsch distillate produced from said Fischer-Tropsch reactor;

h) a distillate upgrader positioned downstream from said distillate hydrotreatment reactor and relative to said naphtha reformer so that the hydrogen by-product from said reformer recirculates to said upgrader so that said upgrader can upgrade hydrotreated distillate produced from said distillate hydrotreatment reactor to produce a distillate fuel and/or a lube base feedstock component;

i) a distillation reactor positioned downstream from said separator for distilling the hydrocarbon condensate and the crude oil to obtain a petroleum-derived naphtha and a petroleum-derived distillate;

j) said distillation reactor being positioned relative to said Fischer-Tropsch reactor, said naphtha hydrotreatment reactor and said distillate hydrotreatment reactor so that the Fischer-Tropsch naphtha mixes with the petroleum-derived naphtha prior to entering said naphtha hydrotreatment reactor forming a blended naphtha having a sulfur level of at least about 10 ppm and so that the Fischer-Tropsch distillate mixes with the petroleum-derived distillate prior to entering said distillate hydrotreatment reactor forming a blended distillate having a sulfur level of at least about 10 ppm; and k) wherein said naphtha hydrotreatment reactor and said distillate hydrotreatment reactor contain at least one catalyst for hydrotreating the naphtha or the blended distillate.

19. The plant of claim 18, wherein said naphtha hydrotreatment reactor and said distillate hydrotreatment reactor constitute a single hydrotreatment reactor.

20. The plant of claim 18, wherein said catalyst comprises at least one of a noble metal and a non-noble metal.

* * * * *